United States Patent [19]

Nordsiek et al.

[11] Patent Number: 4,673,709
[45] Date of Patent: Jun. 16, 1987

[54] HOT-VULCANIZABLE TREAD STRIPS FOR THE MANUFACTURE OF MOTOR VEHICLE PNEUMATIC TIRE TREADS; AND BLOCK COPOLYMERS WHICH CAN BE USED AS THE SOLE CONSTITUENT OF THE RUBBER COMPONENT WHICH IS THE BASIC FORMULATION COMPONENT OF SAID TREAD STRIPS

[75] Inventors: Karl-Heinz Nordsiek, Marl; Jürgen Wolpers, Bochum; Johannes Tornau, Haltern, all of Fed. Rep. of Germany

[73] Assignee: Huls Aktiengesellschaft, Marl, Fed. Rep. of Germany

[21] Appl. No.: 724,176

[22] Filed: Apr. 17, 1985

[30] Foreign Application Priority Data

Apr. 18, 1984 [DE] Fed. Rep. of Germany ....... 3414657
Jul. 5, 1984 [DE] Fed. Rep. of Germany ....... 3424699

[51] Int. Cl.$^4$ .................... C08L 9/00; C08L 53/00
[52] U.S. Cl. ............................ 525/99; 152/209 R; 524/505; 525/98; 525/315
[58] Field of Search ............... 524/505; 525/98, 99, 525/314, 315; 152/209 R

[56] References Cited

U.S. PATENT DOCUMENTS

| | | | |
|---|---|---|---|
| 3,352,944 | 11/1967 | Wheat | 524/505 |
| 3,363,659 | 1/1968 | Keckler et al. | 152/209 R |
| 4,166,052 | 8/1979 | Kusakabe et al. | 152/209 R |
| 4,167,544 | 9/1979 | Ramos et al. | 525/99 |
| 4,255,296 | 3/1981 | Ogawa et al. | 524/505 |

FOREIGN PATENT DOCUMENTS 3414657 12/1984 Fed. Rep. of Germany.
58-12290 7/1983 Japan.

OTHER PUBLICATIONS

Abstract, JP-A-58 122907 (Japan Synthetic Rubber) July, 1983.

Primary Examiner—Allan M. Lieberman
Attorney, Agent, or Firm—Oblon, Fisher, Spivak, McClelland & Maier

[57] ABSTRACT

The invention relates to hot-vulcanizable tread strips which are produced from novel vulcanizable compositions and from which the treads of pneumatic motor tires can be produced. The vulcanizable compositions are based on a rubber component which includes a special, novel rubber component based on isoprene.

The inventive tire treads have an excellent combination of useful properties which can be described by the following set of characteristics:

(a) High flexibility of low temperatures, i.e., the elastic rubber state is retained even at temperatures below −30° C. (i.e., good cold-weather properties);
(b) High vibration-damping over a wide temperature range, and thus good wet skid resistance (i.e., tread safety);
(c) High wear-resistance, and thus long service life (i.e., economic advantages).

The tire treads have good all-weather characteristics, and thus the tires may be used year-round.

5 Claims, 1 Drawing Figure

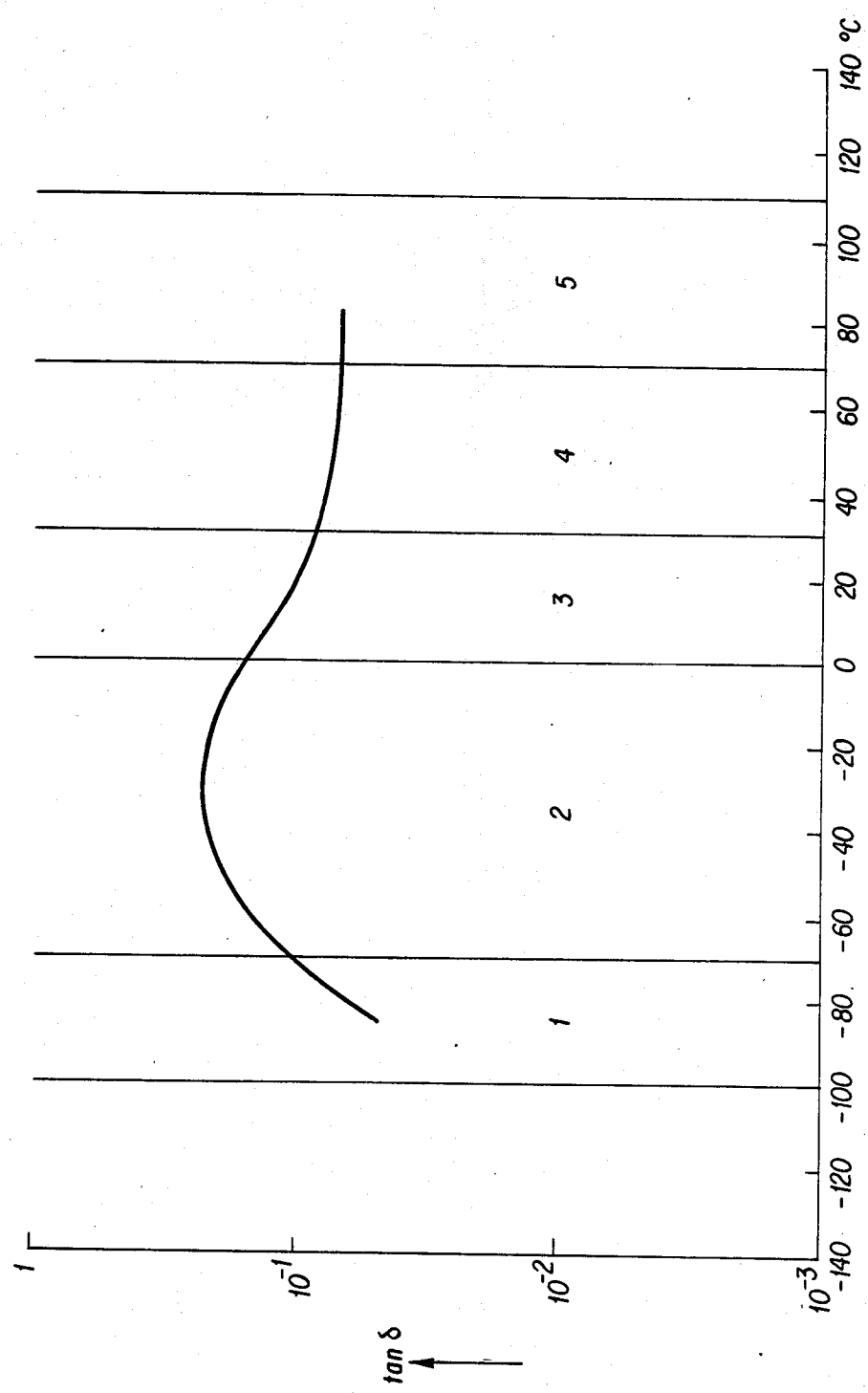

HOT-VULCANIZABLE TREAD STRIPS FOR THE MANUFACTURE OF MOTOR VEHICLE PNEUMATIC TIRE TREADS; AND BLOCK COPOLYMERS WHICH CAN BE USED AS THE SOLE CONSTITUENT OF THE RUBBER COMPONENT WHICH IS THE BASIC FORMULATION COMPONENT OF SAID TREAD STRIPS

BACKGROUND OF THE INVENTION

1. Field of the Invention

The invention relates to hot-vulcanizable tread strips for the manufacture of motor vehicle pneumatic tire treads, said strips being produced from a vulcanizable composition. The treads produced therefrom must have all-weather properties, so that the tires can be used year-round.

The invention also relates to block copolymers which can be used in the rubber component without any additional blend component, which rubber component is the basic formulation component of said tread strips, i.e., said copolymers can be used as the rubber component.

2. Description of Background

Tire treads should be highly rated by a series of properties which are important indices of tread performance. These properties are as follows:

(a) High flexibility at low temperatures, i.e., the elastic rubber state is retained even at temperatures below $-30°$ C. (i.e., good cold-weather properties);

(b) High vibration-damping over a wide temperature range, and thus good wet skid resistance, i.e., tread safety;

(c) High wear-resistance, and thus long service life, i.e., economic advantages.

This set of properties has been attained quite imperfectly with the state of the art treads, e.g., treads based on block homopolymers of 1,3-butadiene, as described in Ger. Pat. No. 2,158,575.

Such prior art block homopolymers have the following characteristics:

(1) They are prepared by adiabatic polymerization in an inert organic solvent in the presence of an organolithium catalyst and, as the cocatalyst a Lewis base selected from the group of ethers and tertiary amines, under, of course, conditions of increasing temperatures. During the course of the polymerization, temperatures exceed 155° C.

(2) They consist of macromolecules having main and side chains with recurring units. Their structure is determined by the temperature at formation of the block homopolymer, i.e., by the polymerization temperature. Since the polymerization temperature increases, and consequently therefore the 1,2-polymerization of 1,3-butadiene decreases, the frequency of recurring units produced by the 1,2-polymerization of 1,3-butadiene and thus the frequency of vinyl side groups decreases continuously while the frequency of recurring units produced by 1,4-polymerization of 1,3-butadiene continuously increases. In the chain segments formed at temperatures above 155° C., the frequencies do not change further with temperature.

(3) The macromolecules have sequences of chain segments which have glass transition temperatures, "Tg" (operationally defined infra), which correspond to the conditions of polymerization which change as polymerization progresses. In general the Tg values begin in the range of about $-25°$ to $-40°$ C., and decrease continually to the range of about $-80°$ to $-95°$ C. This trend of decreasing Tg corresponds to the trend of increasing segment mobility of the chain segments in the main and side chains of the macromolecules.

The Tg of a given chain segment corresponds to the Tg of an entire polymer produced under the same conditions. The mechanical loss factor tan $\delta$ obtained by torsional oscillation of a vulcanized test body, which is obtained from the polymer analogously to the method prescribed in ISO 2322-1975(E) for SBR, is measured according to DIN 53 520, as a function of temperature, yielding a plot of a curve (the "tan $\delta$ curve") having a maximum. The more or less narrow temperature band corresponding to this maximum is the Tg.

By a general (theoretical or quasi-theoretical) treatment of segment mobility it may be determined that the mobility is a function of the bulkiness of the side groups, and is also a function of their frequency in the segment. In other words, the mobility of a given segment is a function of the types of recurring units and their frequency in the segment.

The order of hindrance to segment mobility of the recurring units in block homopolymers of 1,3-butadiene is as follows: Recurring units obtained by the 1,2-polymerization of 1,3-butadiene hinder more than recurring units obtained by the 1,4-polymerization of 1,3-butadiene.

A typical block homopolymer as described in Ger. Pat. No. 21 58 575 is obtained in the absence of branching agents, under the following conditions: Polymerization in hexane in the presence of 0.04 wt.% n-butyllithium (active catalyst) and 1 wt.% ethylene glycol dimethyl ether (said amounts based on the amount of polymer), with the polymerization begun at 30° C. and ended at 160° C.

The block homopolymer thus obtained may be characterized as follows: The tan $\delta$ values of a vulcanized test body obtained from the block homopolymer by a method analogous to that of ISO 2322-1975(E) for SBR, are measured according to DIN 53 520, as a function of temperature yielding a plot of a curve having a single maximum. The curve is relatively narrow in shape; i.e., the half-height width of the tan $\delta$ curve is narrow.

SUMMARY OF THE INVENTION

It is an object of the invention to prepare hot-vulcanizable tread strips for the manufacture of motor vehicle pneumatic tire treads, with which strips better values of the set of properties described supra can be realized than with state of the art tread strips.

Additional properties which it is sought to achieve are good processability of the rubber component in the preparation of the vulcanizable compositions (tread compounds), good processability of the tread compounds in the extrusion step, and good vulcanization performance of the tread strips with regard to the vulcanization rate and crosslink yield in the production of tire treads.

It is a further object of the invention to prepare block copolymers which can be used as the sole constituent of the rubber component of tire treads.

These objects are achieved, in surprising fashion, by:

1. A hot-vulcanizable tread strip for the manufacture of motor vehicle pneumatic tire treads. These strips are produced from a vulcanizable composition which comprises:

an amorphous rubber component;

an active, reinforcing filler material;
an effective amount of a vulcanization agent; and
the usual additives.
(a) The rubber component comprises:
- (a1) 30-100 wt% of a "special rubber component" selected from (a1.1) a block copolymer, (a1.2) a first blend, (a1.3) a second blend, (a1.4) a third blend and (a1.5) a fourth blend.
  - (a1.1) The block copolymer is a copolymer, of 1,3-butadiene, isoprene, and optionally styrene and piperylene.
  - (a1.2) The first blend comprises the block copolymer and a "polymer I". The "polymer I" is a polymer of 1,3-butadiene, and optionally styrene and/or piperylene.
  - (a1.3) The second blend contains the block copolymer and a "polymer II". The "polymer II" is a 1,3-butadiene polymer.
  - (a1.4) The third blend contains a polymer of isoprene and optionally, styrene and/or piperylene. This third blend further contains polymer I.
  - (a1.5) The fourth blend contains an isoprene polymer, the "polymer I" and the "polymer II"; and wherein (a1.1), (a1.2), (a1.3), (a1.4) and (a1.5) contain no styrene blocks.

The rubber component further comprises:
- (a2) 0 to 70 wt.% of one or more other known general purpose rubbers; wherein
  - (b1) the block copolymers, isoprene polymers, and "polymer I" polymers are prepared by polymerization in an inert, organic solvent in the presence of an organolithium catalyst and a Lewis base. The Lewis base may be an ether, a tertiary amine, or a mixture of these. The Lewis base acts as a co-catalyst.
  - (b2.1) The block copolymers are prepared from at least one of 1,3-butadiene and piperylene, along with 10 to <55 wt.% of isoprene and 0 to <1 wt.% of styrene; or along with 10 to <35 wt.% of isoprene and 1 to 15 wt.% of styrene, wherewith the weight percentages stated are on the basis of the block copolymer;
  - (b2.2) The block copolymers comprise an average content of 45 to 80 wt.% of recurring units produced by 1,2- and 3,4-polymerization of the dienes and polymerization of styrene; and an average content of 20 to 55 wt.% of recurring units produced by 1,4-polymerization of the dienes;
  - (b3) The "polymer II" polymers are prepared by Ziegler polymerization, and comprise a content of $\leq 10$ wt.% of recurring units produced by 1,2-polymerization of 1,3-butadiene; and a content of $\geq 90$ wt.% of recurring units produced by 1,4-polymerization, of 1,3-butadiene; and wherein
(c) The rubber component is characterized by the following features:
  - (c1) It has a Mooney viscosity $ML_{1+4}$ at 100° C. according to DIN 53 523 of 30 to 130, a deformation recovery at 80° C. according to DIN 53 514 of 12 to 45, and a nonuniformity defined as $U=(Mw/Mn)-1$ of 0.8 to 5.5;
  - (c2) It has sequences of chain segments in its macromolecules, the glass transition temperatures "Tg" of which sequences cover 2 or 3 partial domains of a Tg domain beginning at $-5°$ to $-20°$ C. and ending at $-50°$ to $-105°$ C.;
  - (c3) The Tg domain or the 1 to 3 partial domains of the Tg domain covered by it correspond(s) to chain segments or sequences of chain segments which are produced by lithium polymerization and which contain branching agents, incorporated at branch points of said segments; and wherein
(d) The "special rubber component" is characterized by the following features:
  - (d1) It has sequences of chain segments in its macromolecules, the glass transition temperatures "Tg" of which sequences cover 2 or 3 partial domains of a Tg domain beginning at $-5°$ to $-20°$ C. and ending at $-50°$ to $-105°$ C.;
  - (d2) The sequences of Tg's corresponding to the sequences of chain segments are characterized in that the Tg's, beginning at the maximum Tg, decrease steadily to the minimum Tg of the covered domain or of the first of the covered partial domains, said coverage being by way of sequences of chain segments: ($\alpha$) in the block copolymer, or ($\beta$)
  - (d3) A vulcanized test body is produced from the "special rubber component", by a technique analogous to that prescribed in ISO 2322-1975(E) for SBR; tan $\delta$ is measured as a function of temperature for this test body according to the measuring method of DIN 53 520;

and the plot of tan $\delta$ vs. temperature is a curve which has only a single well-defined maximum, which is broad.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein the FIGURE shows the tan $\delta$ curve for the "special rubber component 2" of Example 2.

DETAILED DESCRIPTION OF THE PREFERRED EMBODIMENTS

2. In a preferred embodiment of this invention,
(e) a vulcanized test body is produced from the rubber component. The rubber component contains at least one known general purpose rubber. The vulcanized test body is produced by a technique analogous to that prescribed in ISO 2322-1975(E) for SBR; tan $\delta$ is measured as a function of temperature for this test body, according to the measuring method of DIN 53 520. The plot of tan $\delta$ vs. temperature is a curve which has only a single well-defined maximum, which is broad.

3. In another preferred embodiment of this invention,
(f) a vulcanized test body is produced from the vulcanizable composition, by a technique analogous to that prescribed in ISO 2322-1975(E) for SBR. Tan $\delta$ is measured as a function of temperature for this test body, according to the measuring method of DIN 53 520. The plot of tan $\delta$ vs. temperature is a curve which has only a single well-defined maximum, which maximum is broad.

4. In another variation of this invention,
(b) the "special rubber component" has the following features:
  - (g1) the Tg domain or the 1 to 3 partial domains of the Tg domain covered by it correspond(s) to chain segments or sequences of chain segments which are produced by lithium polymerization and which contain branching agents, incorporated at branch points of the segments.

(g2) It has a Mooney viscosity of 30 to 130, a deformation recovery of 12 to 45, and a nonuniformity of 0.8 to 5.5.

5. In another preferred embodiment of this invention,
(h) the 1 to 3 partial domains of the Tg domain covered by the "special rubber component" correspond to sequences of chain segments which contain branching agents, incorporated at branch points of said segments. The sequences of chain segments correspond to 15–70 wt.% of the total monomers which monomers form the basis of the "special rubber component".

6. In another preferred embodiment of this invention,
(i) the "special rubber component" contains divinylbenzene in the amount of 0.02–0.08 wt.%, incorporated into the macromolecules at branch points.

7. In another preferred embodiment of this invention,
(j) the "special rubber component" has a Mooney viscosity of 40 to 100, a deformation recovery of 20 to 40, and a nonuniformity of 1 to 4.

8. In another preferred embodiment of this invention,
(k) the "polymer II" is prepared by Ziegler polymerization with a cobalt catalyst, and has branches.

9. In another preferred embodiment of this invention,
(l) the block copolymers are prepared by polymerization in the temperature range of 30° to 170° C., with the polymerization initiated at $\leq 40°$ C., and terminated $\geq 130°$ C.

10. In another preferred embodiment of this invention,
(m) the rubber component contains:
(m1) 60–100 wt.% of the "special rubber component; and
(m2) 1–40 wt.% of one or more other rubbers from the group of known general purpose rubbers.

11. In another preferred embodiment of this invention, (figures given in (n) and (o) in wt.% are on the basis of the rubber component):
(n) The filler is present in the amount of 40 to 60 wt.%.
(o) The plasticizer oil present as an additive is present in the amount of 0–20 wt.%.
(p) The group of rubbers according to feature (a2) comprises SBR with 10–25wt.% recurring units which are produced by polymerization of styrene, said SBR not containing styrene blocks, 1,4-cis isoprene rubber and natural rubber.

12. In another preferred embodiment of this invention,
(q) the filler material comprises one or more carbon blacks for tire tread use, or a mixture of 80–95 wt.% of such carbon blacks with 5–20 wt.% of one or more active silicic acids treated with silane adhesion promoters.

13. In another preferred embodiment of this invention,
(r1) the block copolymer is prepared from 1,3-butadiene or 1,3-butadiene and piperylene, and in addition: 10 to 55 wt.% isoprene and 0 to <1 wt.% styrene, or 10 to <35 wt.% isoprene and 1–15 wt.% styrene (with these wt.% figures being on the basis of the block copolymer product). The block copolymer does not contain styrene blocks, thus the block copolymer is amorphous.
(r2) The block copolymer is prepared by polymerization in an inert organic solvent in the presence of an organolithium catalyst and a Lewis base. The Lewis base may be an ether, a tertiary amine, or a mixture thereof. The Lewis base serves as a co-catalyst.

(s1) It contains an average of 45–80 wt.% of recurring units obtained by 1,2- and 3,4-polymerization of the dienes and by polymerization of styrene, and an average of 20–55 wt.% of recurring units obtained by 1,4-polymerization of the dienes (these parameters as determined by ir analysis).

(s2) It has a Mooney viscosity ($ML_{1+4}$, 100° C., DIN 53 523) of 30 to 130, a deformation recovery (80° C., DIN 53 514) of 12 to 45, and a nonuniformity $U = (Mw/Mn) - 1$ of 0.8 to 5.5.

(s3) It has sequences of chain segments in its macromolecules, the glass transition temperatures "Tg" of which sequences cover a Tg domain or 2 to 3 partial domains of a Tg domain beginning at $-5°$ to $-20°$ C. and terminating at $-50°$ to $-105°$ C.

(s4) The Tg domain or the 1 to 3 partial domains of the Tg domain covered by it correspond(s) to chain segments or sequences of chain segments which contain branching agents, incorporated at branch points of said segments.

(s5) The sequences of Tg's corresponding to the sequences of chain segments are characterized in that the Tg's beginning at the maximum Tg, decrease steadily to the minimum Tg of the covered domain.

(s6) A vulcanized test body is produced from the block copolymer, by a technique analogous to that prescribed in ISO 2322-1975(E) for SBR; tan δ is measured as a function of temperature for this test body, according to the measuring method of DIN 53 520.

The plot of tan δ vs. temperature is a curve which has only a single well-defined maximum, which is broad.

14. In another preferred embodiment, the block copolymer is characterized as follows:
(t) The 1 to 3 partial domains of the Tg domain covered by the block copolymer correspond to sequences of chain segments which contain branching agents, incorporated at branch points of said segments. The sequences of chain segments correspond to 15–70% of the total monomers which monomers form the basis of the block copolymer.

15. In another preferred embodiment, the block copolymer is characterized as follows:
(u) It contains 0.02 to 0.08 wt.% of divinylbenzene, incorporated at branch points in said macromolecules.

16. In another preferred embodiment, the block copolymer has a Mooney viscosity of 40 to 100, a deformation recovery of 28 to 40, and a nonuniformity of 1 to 4.

17. In another preferred embodiment, the block copolymer is prepared by polymerization in the temperature range 30°–170° C., with the polymerization initiated at $\leq 40°$ C. and terminated at $\geq 130°$ C.

The term "block copolymers" is understood to mean polymers which comprise blocks which are characterized by the fact that the chain segments which adjoin a block boundary on either side differ in the type or number of the underlying monomers.

The block copolymers of 13 to 17 above correspond to a group of originally disclosed and differentially described block copolymers (see 1, 5 to 7, and 9 above).

The features (d3), (e), and (f) in 1 to 3 above, and feature (s6) in 13 above serve as individual selection criteria which are as a rule satisfied by the inventive special rubber components, rubber components, vulcanizable compositions, and block copolymers from which the selection is made.

The special rubber component is novel.

The block copolymers which may be, (but need not mandatorily be) employed as the sole constituent of the special rubber component are also novel (see 13 to 17 above).

The decreasing trend of the Tg's of the chain segments of the macromolecules of the special rubber component corresponds to the increasing trend of segment mobilities.

The order of the recurring units with regard to their impairment of the segment mobility is as follows: Recurring units obtained by polymerization of styrene or by the 1,2-polymerization of piperylene hinder more than the recurring units obtained by the 1,2- or 3,4-polymerization of isoprene or by the 3,4-polymerization of piperylene, which hinder more than the recurring units obtained by the 1,2-polymerization of 1,3-butadiene, which hinder more than recurring units obtained by the 1,4-polymerization of isoprene or piperylene, which hinder more than recurring units obtained by the 1,4-polymerization of 1,3-butadiene.

The block copolymers and the "polymers I" have long chain branches, because of the high polymerization temperatures (over 90° C.). These are desired in order to minimize the cold flow of the block copolymers and the "polymers I". If there are insufficient long chain branches, the polymerization reaction may be carried out in the presence of branching agents, e.g., 0.02 to 0.08 wt.% of divinylbenzene, based on the amount of block copolymer and of the "polymer I", or in the presence of t-butyl chloride.

Branching of the block copolymers and the "polymers I" can also be brought about by coupling reactions with suitable coupling agents, i.e., special branching agents. Thus, e.g., the solutions of the polymers corresponding to the blocks of the block copolymers, which are present as "living polymers", can be combined in the presence of tetrachloromethane, whereby star-shaped block copolymers are obtained.

The preceding discussion relating to the incorporation of branching agents applies analogously in the case of isoprene polymers.

It has been discovered that the incorporation of branching agents at branching points in macromolecules obtained through lithium polymerization is not only advantageous with regard to the minimization of cold flow, but also with regard to maximal attainment of the above-described set of desirable properties.

The teaching of the present invention regarding the 1 to 3 partial domains of the Tg domain covered by the "special rubber component" or by the block copolymer, and regarding the associated (with these data) sequences of chain segments, which sequences correspond to 15–70 wt.% of the total weight of the monomers upon which the "special rubber component" or the block copolymer is based (feature (h) of 5 above, and feature (t) of 14 above), has the following meaning:

The branch points should not be more or less evenly distributed in the individual macromolecules, nor be present in a part of the population of the macromolecules. The branch points in the macromolecules of the "special rubber component" or the block copolymer should be distributed over the sequences of their chain segments produced by the lithium polymerization in a distribution of said branch point such that 1 to 3 partial domains of the entire covered Tg domain result in connection with a relatively high degree of branching, and the other partial domain or domains results in connection with a relatively low degree of branching, of the respective sequences of chain segments associated with said partial domains.

It can also be advantageous if a partial domain of the Tg domain covered by the "special rubber component" corresponds to a "polymer II" (see, e.g., 8 above) which has branches.

The recurring units which are obtained by the 1,2- and 3,4-polymerization of the dienes, by the 1,4-polymerization of the dienes, and by polymerization of styrene, are determined by ir analysis.

The block copolymers are prepared generally by polymerization of the monomers in a hydrocarbon solvent in the presence of 0.02 to 0.08 wt.% of a $C_4$-alkyllithium (active catalyst), particularly n-butyllithium, and 0.2 to 2 wt.% of a bifunctional Lewis base selected from the group of ethers, tertiary amines, and mixtures thereof, as a co-catalyst (with the wt.% figures being on the basis of the resulting block copolymer) with the co-catalyst and catalyst being present in the weight ratio of from 3:1 to 200:1, at temperatures from 30° to 170° C., wherewith the polymerization is begun at $\leq 40°$ C. and terminated at $\geq 80°$ C., preferably at $\geq 130°$ C.

The course of the temperature in relation to monomer conversion in the preparation of the block copolymers can be controlled by various means, e.g., by the ratio of the solvent to monomer in the reaction mixture or by controlling the temperature of the monomer and/or solvent as they are fed in metered fashion, or by adding or removing heat.

The block copolymers may be prepared by batch or continuous polymerization.

The block copolymers in general have features as described as follows. The following abbreviations are employed in the characterization of the blocks:

Tk—Prepared at constant temperature of polymerization (isothermal polymerization).

Ts'Prepared under constantly increasing temperature of polymerization (a special case of this is adiabatic polymerization).

Mk—Prepared at constant composition of monomer.

Ms—Prepared with a mixture of monomers the composition of which varies continuously.

%—Percent by weight, based on the weight of the basic monomer mixture.

"A-B" Block Copolymers [Isoprene-Butadiene]:

(1)

Block A: Ts, Mk, isoprene. Before beginning block B, the temperature is reduced.
Block B: Ts, Mk, 1,3-butadiene.

(2)

Block A: Tk, Ms. Starting with 100% isoprene, continously falling to 0%, and starting with 0% 1,3-butadiene and continuously increasing to 100%.
Block B: Ts, Mk, 1,3-butadiene.

"A-B-C" Block Copolymers [(Isoprene-Butadiene)]:

(3)

Block A: Ts, Mk, isoprene.
Block B: Tk, or Ts, Ms. Starting with 100% isoprene, continuously falling to 0%, and starting with 0% 1,3-butadiene and continuously increasing to 100%.
Block C: Ts, Mk, 1,3-butadiene.

"A-B" Block Copolymers [(Isoprene-Styrene-Butadiene)]:

(4)

Block A: Ts, Mk, isoprene 80-90%, and styrene 10-20%. Temperature reduced before beginning block B.

Block B: Ts, Mk, 1,3-butadiene.

(5)

Block A: Tk, Ms. Isoprene beginning at 75-90%. Styrene beginning at 10-25%. Both isoprene and styrene falling continuously over time to 0%. 1,3-Butadiene beginning at 0% and increasing continuously to 100%.

Block B: Ts, Mk, 1,3-butadiene.

"A-B-C" Block Copolymers [(Isoprene-Styrene-Butadiene)]:

6.

Block A: Ts, Mk, isoprene 80-90%, styrene 10-20%.

Block B: Tk or Ts, Ms. Isoprene and styrene beginning in the proportions as in Block A, and both falling continuously over time to 0%. 1,3-Butadiene beginning at 0% and increasing continuously to 100%.

Block C: Ts, Mk, 1,3-butadiene.

(7)

Block A: Tk, Ms. Isoprene beginning at 80-90%, falling continuously over time to 0%. Styrene constant at 10-20%. 1,3-Butadiene beginning at 0% and increasing continuously to 80-90%.

Block B: Tk or Ts, Ms. Styrene and 1,3-butadiene beginning in the proportions as at the end of the preparation of Block A, (but here isoprene is not a constituent), wherewith the styrene falls continuously over time to 0% and the 1,3-butadiene increases continuously to 100%.

Block C: Ts, Mk, 1,3-butadiene.

In general, the block copolymers are prepared from either:

15 to <35 wt.% isoprene and >65 to 85 wt.% 1,3-butadiene; or 10-30 wt.% isoprene, 5-15 wt.% styrene, and 55-85 wt.% 1,3-butadiene (with all figures based on the weight of the block copolymer product).

The features of the isoprene polymers and of the "polymer I" polymers in general correspond to those of the corresponding blocks of the block copolymers, in particular the above-described block copolymers. Their preparation is basically known.

The features of the blends of the isoprene polymers and the "polymer I" polymer in general correspond to those of the block copolymers, in particular the block copolymers described above. (Such features are, e.g., the segment mobility at the "terminal end" of the isoprene polymer macromolecules, and at the "initial end" of the "polymer I" macromolecules; and the blend ratio.)

The "polymer II" polymers may be prepared in known fashion (see, e.g., *Hydrocarbon Processing*, Vol. 44, No. 11, November 1965, p. 260).

The "special rubber component", the rubber component, and the vulcanizable composition are distinguished in that the tan $\delta$ curves obtained as above are substantially wider than the tan $\delta$ curve (obtained as above) for a typical block copolymer according to the state of the art.

It has been discovered that this fact, in combination with features (d3), (e), and (f) in 1 to 3 above, provides an indication of the fact that the treads and tread strips according to the invention can achieve the criteria of the combination of properties presented supra, to a substantially better extent than treads and tread strips according to the state of the art.

The tan $\delta$ vs. temperature curves shows a different shape of tan $\delta$ for the vulcanized test bodies produced from the "special rubber component", the rubber component, or the vulcanizable composition, analogous to that prescribed in ISO 2322-1975(E) for SBR, is measured however not employing the measuring technique of DIN 53 520 but instead a measuring technique with a "Rheovibron" device at 1 Hz, where tan $\delta$ is measured as a function of temperature and plotting as usual.

It has been found that the configuration of this plot in various characteristic temperature domains can be associated with particular properties of the tire treads.

For example, the FIGURE shows the tan $\delta$ curve based on "special rubber component 2" of the invention (see Example 2). Here the temperature domains 1 to 5 are indicated.

The plot in the various temperature domains can be associated with properties of the tire treads, as follows: Domain 1—low temperature properties and abrasion (wear); Domain 2—suitability for winter use; Domain 3—wet skid resistance (wet traction); Domain 4—rolling resistance; Domain 5—heat buildup.

As the material leaves the total glass state, the beginning of rubberlike elastic behavior is indicated. The curve gives information about the low temperature properties and tread wear (temperature domain 1).

In temperature domain 2, the curve gives information about the stability for winter use.

In temperature domain 3, the level of tan $\delta$ is a conclusive indication of the traction behavior, particularly on wet roads (tan $\delta$ should be sufficiently high).

Temperature domain 4 encompasses the normally encountered operating temperatures of a tire. The curve here essentially provides an evaluation of the rolling resistance (tan $\delta$ should be as low as possible here).

Temperature domain 5 corresponds to the highest temperature-associated stress conditions on the tire, wherein the bounds of functionality are reached. The heat buildup behavior and the incipient thermal breakdown of the tire can be estimated from the curve here. (Tan $\delta$ should be as low as possible here).

The tan $\delta$ curve (measured with a "Rheovibron" at 1 Hz) gives the specialist the required rough picture so that, with the aid of the teaching of the invention, namely by varying the manufacturing parameters for the tread strips, he can produce tire treads with a given desired set of properties (tailor made tire treads).

These optimizing steps taken by the specialist essentially reduce to suitably modifying the shape of the tan $\delta$ curve (obtained with a "Rheovibron" at 1 Hz) of the vulcanized test bodies which are based on the "special rubber component", the rubber component, or the vulcanizable composition.

One means of accomplishing this modification of the curve is by controlling the segment mobilities of the sequence of chain segments, thereby covering the Tg domains associated with the properties of interest of the tire treads. This approach may be referred to as the "qualitative approach".

In addition, the curve is modified by choosing the relative weights of such sequences of chain segments. This may be referred to as the "quantitative approach".

The "special rubber component" may be used in the vulcanizable compositions by itself or in blends with one or more other rubbers from the group of known general purpose rubbers.

The rubber component comprises, as a rule, not more than four, and preferably not more than three, polymer components. The amount of a given polymer component in the blend is as a rule $\geq 10$ wt.%.

Active, reinforcing filler materials include, e.g., carbon blacks for tread formulation, of various activities, particularly those of the ASTM "N-300" series, active silicic acids, treated with silane adhesion-promoters, and mixtures of these materials. They can be employed in the customary amounts.

The term "vulcanization agent" should be understood to mean known vulcanization systems. A preferred vulcanization system is comprised of sulfur in combination with the usual accelerators. The amount of the vulcanization agent depends on the other components of the mixture, and can be readily determined by simple testing.

The customary plasticizing oils used in rubbers may be employed as additives. Preferred plasticizers are aromatic, aliphatic, and naphthenic hydrocarbons. They may be employed in the usual amounts.

Other additives customary in the rubber industry may also be employed, e.g., resin acids, agents to protect against aging, and waxes to protect against ozone. These materials are used in effective amounts.

The equipment used for producing the vulcanizable compositions from the mixture components, and for processing the vulcanizable compositions into tread strips and vulcanizates (tire treads) may be the ordinary equipment used in the tire industry for mixing, molding, shaping, and vulcanizing; e.g., internal mixers, rolls, extruders, calenders, injection molding apparatuses, vulcanization presses, and continuously operating curing units.

The tread strips according to the invention are suitable for manufacturing tire treads for tires of automobiles and highway trucks. They are suitable for the manufacturing of new tires as well as the retreading of old tires.

The tire treads produced with the tread strips according to the invention have all-weather properties. Accordingly, they can be used year-round.

The tire treads produced with tread strips according to 11 and 12 above are further distinguished in that they have low rolling resistance which means that they have high use economy regarding energy consumption, along with high wet-traction (wet skid resistance and safety properties). Worthy of note are their usually high reversion stability during the vulcanization process, and their unusually high tire tread crosslink stability under dynamic load. Accordingly, the tread strips according to 11 and 12 above are particularly suited for manufacturing truck tire treads.

In the interest of clarity in communicating the teaching of the invention, throughout the present specification and claims, numerous obvious variants have been omitted (combinations of means and features) which are conceivable and which might be recited, but which would surely suggest themselves to one skilled in the art who had acquainted himself with the teaching provided herein. Thus, the teaching goes beyond the literal wording of the claims.

The invention will be illustrated by the following manufacturing prescriptions and examples. References to "parts" as quantities will be understood to mean "parts by weight".

The "special rubber components" 1 to 3 will be described via Examples 1 to 3. Vulcanized test bodies were prepared from these "special rubber components" in a manner analogous to that set forth in ISO 2322-1975(E) for SBR. The tan $\delta$ values of these test bodies were measured as functions of temperature, using the method of DIN 53 520. The resulting plots of tan $\delta$ will be discussed infra.

The following polymers were used as the bases for the "special rubber components":

Block copolymers 1 and 2, both based on 1,3-butadiene and isoprene;
Isoprene polymer, based on isoprene;
"Polymer I", based on 1,3-butadiene.
"Polymer II", based on 1,3-butadiene.

Preparation of "Block Copolymer 1":

215 Parts hexane, 30 parts isoprene, 0.6 parts ethylene glycol dimethyl ether ("DME") and 0.014 parts divinylbenzene ("DVB") were introduced into a stirred autoclave, with careful exclusion of air and moisture. The polymerization was initiated at 40° C., with addition of n-butyllithium (0.038 parts active catalyst). Because of the liberation of the heat of polymerization, the temperature rose, and after 12 min reached 58° C. (corresponding to about 50% conversion of the isoprene). Then a solution of 70 parts 1,3-butadiene and 0.032 parts DVB in 104 parts hexane was added at a uniform rate over 5 min, with the added solution having a temperature of 40° C. The temperature increased to 148° C. After completion of the polymerization, 0.5 parts 2,2-methylenebis(4-methyl-6-t-butylphenol) was added. The solvent was stripped with steam, and the polymer was dried and characterized as shown in the Table.

Preparation of "Block Copolymer 2":

215 Parts hexane, 30 parts isoprene, 1.2 parts DME and 0.03 parts DVB were combined as above. The polymerization was initiated at 40° C. with addition of 0.045 parts (of active catalyst) of n-butyllithium. After 30 min the temperature reached 65° C. (corresponding to 100% conversion of the isoprene). After cooling to 44° C. a solution of 70 parts 1,3-butadiene in 104 parts hexane was added at a uniform rate over 10 min, with the added solution having a temperature of 40° C. The temperature rose to 80° C. After completion of the polymerization, the remainder of the procedure was as described above (see the Table for the measured parameters).

Preparation of the Isoprene Polymer:

400 Parts hexane, 100 parts isoprene, 1.2 parts DME, and 0.04 parts DVB were combined as above. The polymerization was initiated at 40° C. with addition of 0.04 parts (of active catalyst) of n-butyllithium. The temperature increased to 75° C. After completion of the polymerization, the remainder of the procedure was as above (see the Table for the measured parameters).

Preparation of "Polymer I":

400 Parts hexane, 100 parts 1,3-butadiene, and 0.5 parts DME were combined as above. The polymerization was initiated at 30° C. with addition of 0.038 parts (of active catalyst) of n-butyllithium. After 16 min, the temperature reached 118° C. After completion of the polymerization, the remainder of the procedure was as above (see the Table for the measured parameters).

"Polymer II":

"Polymer II" is a commercially available high-cis polybutadiene which is produced by Ziegler polymerization using a cobalt catalyst, and is branched (see the following table for the measured parameters).

| Polymer | Characterization of the Polymers Used as Bases for the Special Rubber Components | | | | |
|---|---|---|---|---|---|
| | Block-copolymer 1 | Block-copolymer 2 | Isoprene Polymer | Polymer I | Polymer II |
| Gel content (wt. %)* | <1 | <1 | <1 | <1 | <1 |
| Recurring units obtained by 1,2-Polymerization of the dienes (wt. %)** | 34 | 47 | 9 | 53 | 1 |
| Recurring units obtained by 3,4-Polymerization of the Isoprene (wt. %)** | 26 | 27 | 76 | — | — |
| $ML_{1+4}$, 100° C., DIN 53 523 | 76 | 52 | 84 | 45 | 47 |
| Deformation Recovery, 80° C., DIN 53 514 | 27 | 26 | 31 | 8 | 32 |
| $T_g$ (°C.) | — | — | −13 | −59 | ca. −100 |

*Determined by the method described in German Patent 21 58 575, column 12 ff.
** Determined by IR-Analysis

EXAMPLE 1

("Special Rubber Component 1")

"Block copolymer I" was characterized as described above, by the tan δ curve. The curve shows only a single, broad maximum (feature ($d_3$) of 1 above.

EXAMPLE 2

("Special Rubber Component 2")

70 Parts of "block copolymer 2" and 30 parts of "polymer II" were mixed in an internal mixer. The resulting blend of the two rubbers was characterized by the tan δ curve. The curve showed only a single, broad maximum. The curve was distinctly broader than the curve in Example 1.

EXAMPLE 3

("Special Rubber Component 3")

20 Parts of the isoprene polymer, 50 parts of "polymer I", and 30 parts of "polymer II" were mixed in an internal mixer. The resulting blend of the three rubbers was characterized by the tan δ curve. The curve showed only a single, broad maximum. The curve was distinctly broader than the curve in Example 1.

The "special rubber components" Nos. 1-3 can be used to produce tread strips with which the above-described combination of desirable properties can be attained in a substantially better way than with state of the art tread strips.

What is claimed as new and desired to be secured by Letters Patent of the United States is:

1. A blend of rubbers, comprising a polymer and a block copolymer, wherein:
   (a) the said polymer is produced by Ziegler polymerization of 1,3-butadiene and wherein the said polymer comprises a content of ≦10 wt.% of recurring units produced by 1,2-polymerization of 1,3-butadiene, and a content of ≧90 wt.% of recurring units produced by 1,4-polymerization of 1,3-butadiene;
   (b) the said block copolymer is prepared from 1,3-butadiene and
     (b1) 10 to <55 wt.% isoprene and 0 to <1 wt.% styrene, or
     (b2) 10 to <35 wt.% isoprene and 1 to 15 wt.% styrene,
   wherein
   the said block copolymer is amorphous and contains no polystyrene blocks; and wherein
   the said block copolymer is prepared by polymerization in an inert organic solvent in the presence of an organolithium and a Lewis base selected from the group consisting of ethers, tertiary amines, and mixtures thereof said organolithium serving as a catalyst and, said Lewis base serving as a co-catalyst; and wherein
   the said block copolymer contains an average of 45 to 80 wt.% of recurring units obtained by 1,2- and 3,4-polymerization of 1,3-butadiene and isoprene, and by polymerization of styrene, and an average of 20 to 55 wt.% of recurring units obtained by 1,4-polymerization of said 1,3-butadiene and isoprene; and wherein
   the said block copolymer has sequences of chain segments in its macromolecules, wherein the glass transition temperatures ($T_g$) of said sequences cover a $T_g$ temperature range or 2 or 3 partial temperature ranges of a $T_g$ temperature range beginning at −5° to −20° C. and terminating at −50° to −105° C.; and wherein
   the $T_g$ temperature range or 1 to 3 partial temperature ranges of the $T_g$ temperature range covered by said block copolymer corresponds to chain segments or sequences of chain segments which contain branching agents, incorporated at branch points of said segments; and wherein
   (c) the said blend is further characterized by the following features:
     (c1) said sequences of $T_g$s corresponding to said sequences of said chain segments are characterized in that the $T_g$s beginning at the maximum $T_g$, decrease steadily to the minimum $T_g$ of the covered temperature range or of the first of the covered partial temperature ranges, said coverages of the first of the partial temperature ranges being by way of sequences of chain segments in said block copolymer; and wherein
     (c2) the said blend has a Mooney viscosity ($ML_{1+4}$ 100° C., DIN 53 523) of 30 to 130, a deformation recovery (80° C., DIN 53 514) of 12 to 45, and a nonuniformity $(U=(M_w/M_n)-1)$ of 0.8 to 5.5; and wherein (c3) a vulcanized test body produced from said blend by a technique analogous to that described in ISO 2322-2975 (E) for SBR, dimensioned according to DIN 53 520, and wherein tan δ for said test body is measured as a function of temperature according to the measuring method of DIN 53 520, has a plot of tan δ versus temperature which is a curve having only a single well-defined maximum, which is broad.

2. The blend of rubbers of claim 1, wherein said blend has a Mooney viscosity of 40 to 100, a deformation recovery of 20 to 40, and a nonuniformity of 1 to 4.

3. The blend of rubbers of claim 1, wherein said blend is comprised of ≦90 wt.% of said block copolymer and ≧10 wt.% of said polymer prepared by Ziegler polymerization.

4. The blend of rubbers of claim 1, wherein said polymer prepared by Ziegler polymerization is obtained with a cobalt catalyst, and has branches.

5. The blend of rubbers of claim 1, wherein said block copolymer contains 0.02 to 0.08 wt.% of divinyl benzene, incorporated at branch points in said macromolecules.

* * * * *